United States Patent
Searle et al.

[11] Patent Number: 5,957,721
[45] Date of Patent: Sep. 28, 1999

[54] CORD RETAINER

[75] Inventors: John F. Searle, Hudson; Joseph A. Juratovac; R. Reade Harpham, both of Columbus, all of Ohio

[73] Assignee: McCulloch Corporation, Tucson, Ariz.

[21] Appl. No.: 08/899,196

[22] Filed: Jul. 23, 1997

[51] Int. Cl.⁶ .................................................. H01R 13/72
[52] U.S. Cl. ........................ 439/501; 439/457; 248/52; 191/12 R
[58] Field of Search .................................. 439/501, 457; 248/52; 191/12 R

[56] References Cited

U.S. PATENT DOCUMENTS

| | | |
|---|---|---|
| 1,528,493 | 3/1925 | Lamb . |
| 4,047,299 | 9/1977 | Bair ............................................ 30/276 |
| 4,167,301 | 9/1979 | Mundschenk . |
| 4,875,879 | 10/1989 | Bunyea et al. ........................... 439/501 |
| 5,224,246 | 7/1993 | Royball ..................................... 24/129 |
| 5,318,158 | 6/1994 | Seasholtz .............................. 191/12 R |
| 5,547,390 | 8/1996 | Laherty ..................................... 439/457 |
| 5,620,336 | 4/1997 | Worthing ................................. 439/501 |
| 5,644,844 | 7/1997 | Pink .......................................... 30/276 |

FOREIGN PATENT DOCUMENTS 555507  7/1932  Germany .

OTHER PUBLICATIONS

Weed Eater Operator's Manual, Model 1214 and Model 1216 (1987).
Paramount Owner's Manual Model 960–00 Lawn Edger (1987).
Copy of two photographs of Paramount Model 960 Lawn Edger (1987).

*Primary Examiner*—Gary F. Paumen
*Attorney, Agent, or Firm*—Marshall, O'Toole, Gerstein, Murray & Borun

[57] ABSTRACT

A retainer for an electric cord on an electric power device or the like includes a handle with a slot or passageway through the handle. The handle is loop shaped and has a hook inside the loop spaced from the slot or passageway. The slot or passageway is oriented vertically, as are the hook and the handle itself. A cord may be passed through the vertical passageway and around the vertically extending hook such that the cord is twisted ninety degrees between the passageway and the hook.

6 Claims, 2 Drawing Sheets

CORD RETAINER

FIELD OF THE INVENTION

The present invention relates generally to devices for retaining cords on an apparatus, and more particularly to devices for absorbing the strain on an electric cord in order to prevent the cord from becoming unplugged from an electrically powered apparatus.

BACKGROUND OF THE INVENTION

Many electrically powered devices have no power cord or only a short power cord, and therefore require the use of an extension cord connected between the electrically powered device and an electric outlet. When the electrical apparatus is mobile, i.e. a string trimmer, an edger, a chainsaw, a vacuum cleaner, etc., the extension cord may become unplugged from the apparatus during movement. Therefore, various cord retention or strain relief devices have been used that secure the cord at or near the cord's end in order to absorb any force that might otherwise disconnect the cord from the electrical apparatus.

Generally, cord retention devices will be placed in the handle or housing of the electrical apparatus near the electrical apparatus' electric plug or receptacle. Numerous cord retention devices are known, including those with moving parts, that grab or clasp the cord when engaged. Other designs provide an aperture through which a loop of the cord is fed and then wrapped around a hook, thereby frictionally holding the cord in place. While such aperture and hook designs may be easy to use and are generally satisfactory in securing the cord, they undesirably may require the enlargement of the handle or housing in which the cord retention device is located. In order to feed a loop of the cord through the aperture, the aperture must be relatively large, and therefore, requires a large area on the handle or housing in which to place the aperture.

SUMMARY OF THE INVENTION

In accordance with one aspect of the present invention, a cord retainer includes a slot that defines a first plane, and a hook that defines a second plane. The first plane is generally parallel to the second plane. The cord retainer may be associated with a handle defining a major plane where the major plane is generally parallel with the first plane. The cord retainer may be associated with a looped handle where the slot is located in the handle and the hook is attached to the handle. The first plane may be coplanar with the second plane.

In accordance with another aspect of the present invention, a cord retainer may be associated with a handle having a major plane and a slot located in the handle where the slot defines a slot plane. A hook is connected to the handle and is spaced from the slot. The major plane is generally parallel with the slot plane.

The slot plane may be coplanar with the major plane. The hook may define a hook plane, and the hook plane may be generally parallel to the slot plane.

Other features and advantages are inherent in the cord retainer claimed and disclosed or will become apparent to those skilled in the art from the following detailed description in conjunction with the accompanying drawings.

DETAILED DESCRIPTION OF THE PREFERRED EMBODIMENT

Figure 1:
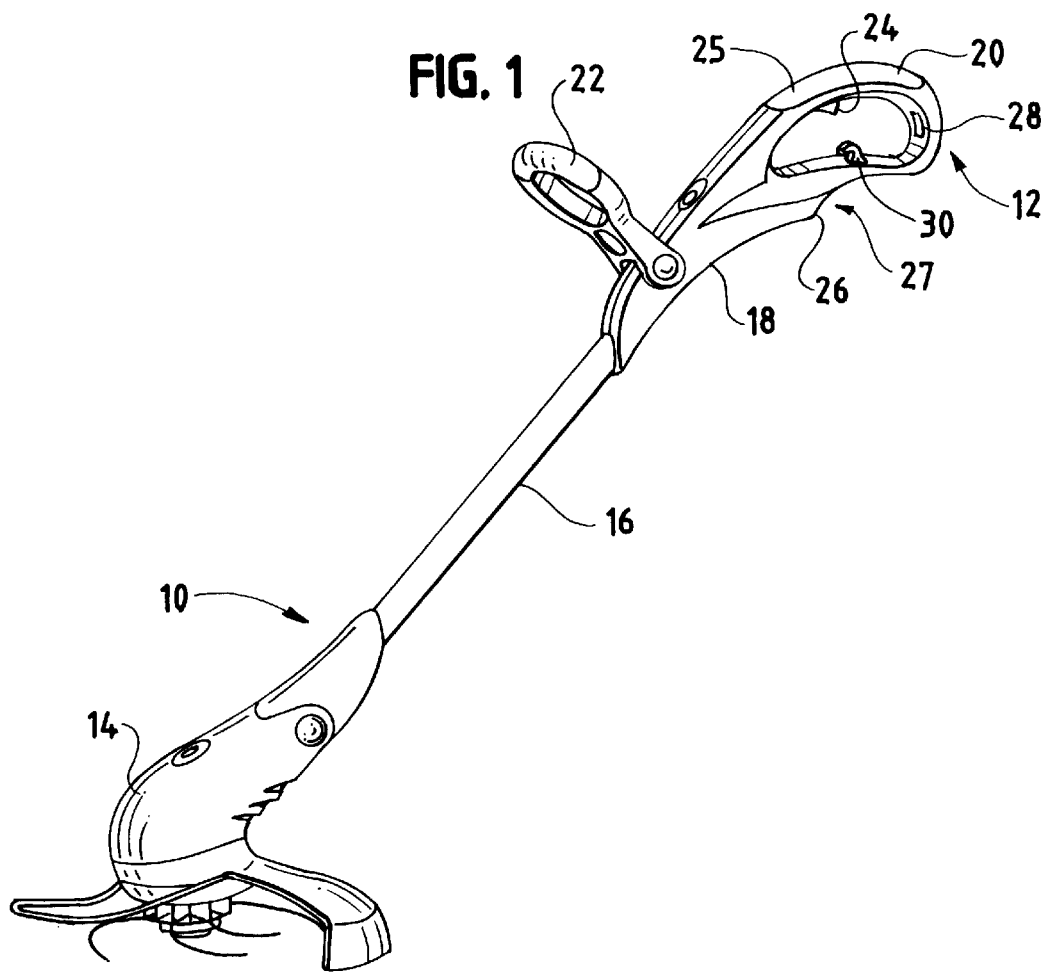
FIG. 1 is a perspective view of a string trimmer utilizing the cord retainer of the present invention.

Referring initially to FIG. 1, a string trimmer, indicated generally at 10, incorporates the cord retainer, indicated generally at 12, of the present invention. The string trimmer 10 has a motor housing 14 connected by a boom 16 to an upper housing 18. The upper housing 18 has a handle 20 and carries an auxiliary handle 22. The handle 20 is loop shaped with a trigger 24 on the underside of a top portion 25 of the loop. On the underside of a bottom portion 26 of the handle 20 is a cord receptacle indicated generally at 27 for receiving an end of an electric extension cord (not depicted in FIG. 1). When the extension cord is plugged into the cord receptacle 27 and the trigger 24 is depressed, power flows through an internal power cord (not depicted) from the upper housing 18, through the boom 16, and into the lower housing 14 in order to drive a motor (not depicted) for operating the string trimmer 10. The upper handle 20 also includes a slot or passageway 28 in the rear of the loop, and a hook 30 located on the upper side of the bottom portion 26 of the loop, spaced from the slot or passageway 28. Although a string trimmer is depicted in FIG. 1, the cord retainer 12 of the present invention may be used with any device or apparatus that requires the retention of a cord, such as electric-powered devices.

Figure 2:
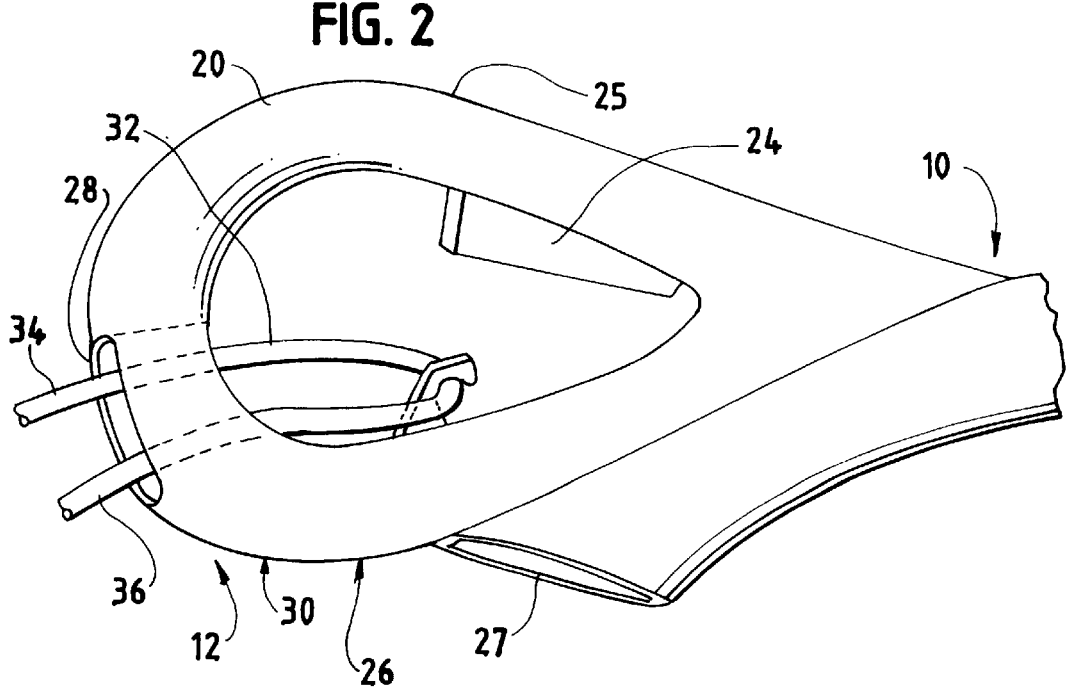
FIG. 2 is an enlarged perspective view of the handle of the string trimmer of FIG. 1 showing the cord retainer of the present invention engaged with a cord.

FIG. 2 depicts an cord 32 held in place by the cord retainer 12. If the cord 32 is an electric cord (e.g., an extension cord), one of its ends (not depicted) would be inserted into the cord receptacle 27 in order to provide power to the string trimmer 10. The cord 32 has been bent back on itself to form a bite or loop that has been fed through the slot or passageway 28. After passing entirely through the slot or passageway 28, the cord 32 is looped over the hook 30 and the pulled backward into the hook 30 to secure the cord 32. If one end of the cord 32 is pulled in a direction away from the handle 20, friction between the cord 32 and the sides of the passageway 28 and between the cord 32 and the hook 30 will inhibit movement of the cord 32, thus retaining the cord 32 on the handle 20.

Figure 3:
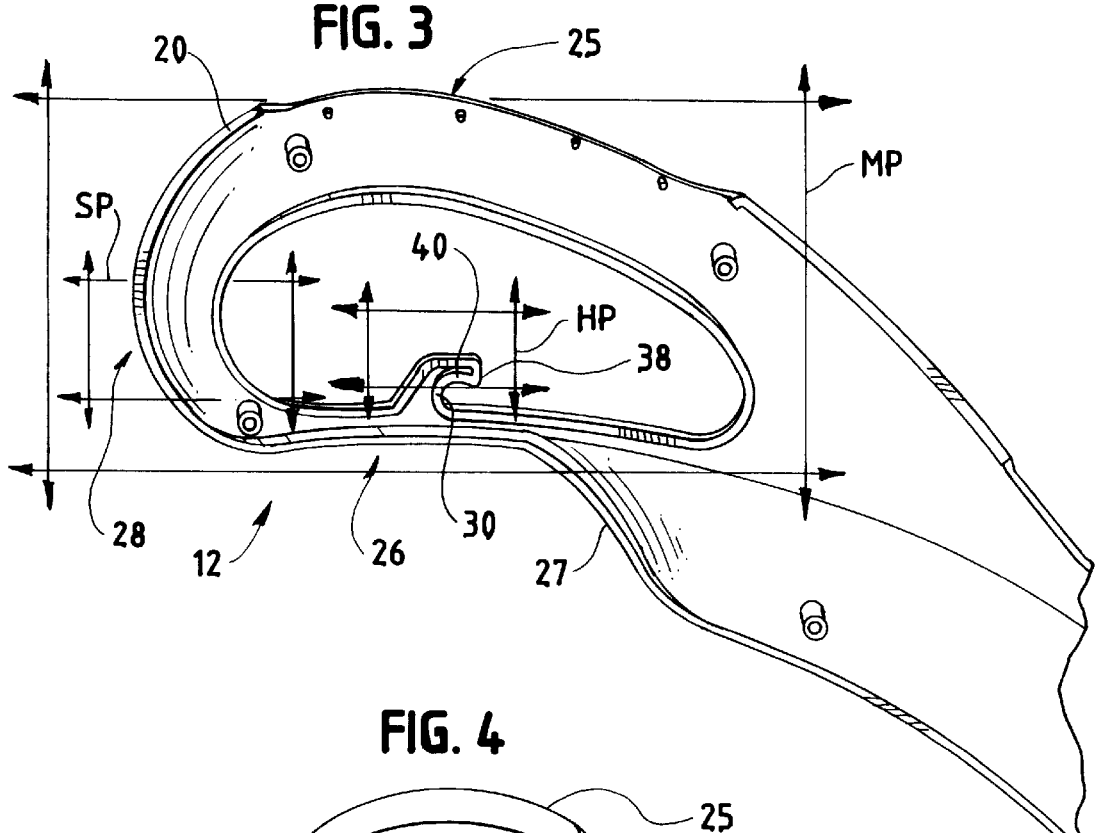
FIG. 3 is a side view of half of the handle of FIG. 2.

As seen in FIG. 3, the passageway or slot 28 defines a slot plane SP. The slot plane SP divides the slot or passageway 28 vertically (from the top portion 25 to the bottom portion 26 of the handle 20) along the greatest dimension of the slot 28. Similarly, the hook 30 defines a hook plane HP that divides the hook 30 vertically. In addition, the handle has a handle major plane MP that divides the handle 20 vertically. The slot plane SP and the hook plane HP are generally parallel and may in fact be coplanar. Similarly, the major plane MP and the slot plane SP are generally parallel and may be coplanar.

Returning to FIG. 2, an advantage of having orientation of the slot 28 and orientation of the hook 30 be generally parallel or coplanar is that the loop of the cord 32 must be twisted one-quarter turn (ninety degrees) after it passes through the slot or aperture 28 before it passes around the hook 30. As the cord 32 passes through the slot or passageway 28, a plane connecting a first side 34 of the cord 32 to a second side 36 of the cord 32 has a generally vertical orientation. However, as the cord 32 passes around the hook 30, the cord 32 has a generally horizontal orientation. This twist in the cord 32 provides a moderate amount of spring loading to the cord 32, that is believed to help retain the cord 32 on the hook 30 more securely. Thus, by orienting the slot or passageway 28 vertically and the hook 30 vertically, a more secure cord retainer may be provided.

As noted previously, the slot plane SP and the major plane MP are generally parallel or coplanar. Such an arrangement is advantageous in that it allows for a narrower handle 20. If, for instance, the slot or passageway 28 was rotated 90 degrees so that the slot had a larger horizontal dimension than vertical dimension, the handle would have to be widened, thereby requiring extra material and increasing the expense of the unit.

Returning to FIG. 3, the hook 30 has a lip 38 that is spaced approximately 0.30 inches from the handle 20. A partially circular recess 40 is formed inside the hook 30 and has a diameter of approximately 0.35 inches.

Figure 4:
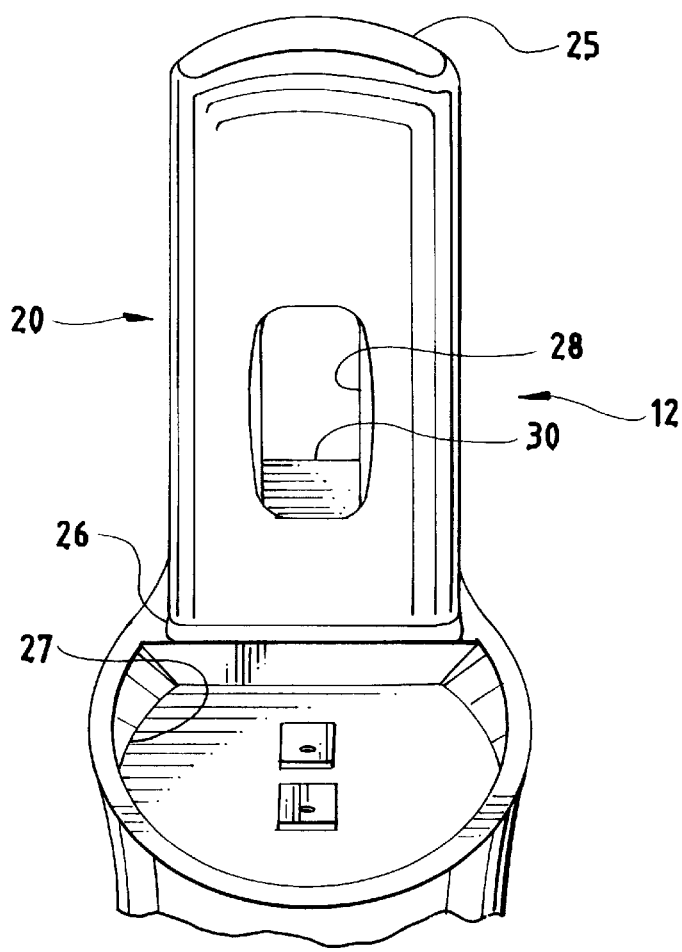
FIG. 4 is a rear elevational view of the handle of FIG. 2.

Referring now to FIG. 4, an end view of the slot 28 is shown. The length of the slot 28 is approximately 1.63 inches and the width is approximately 0.45 inches. However, the edges of the slot are rounded slightly so that the slot length and slot width are slightly larger if measured at the back edge of the handle 20.

The handle 20, including the cord retainer, may be made of a variety of materials including talc-filled polypropelene.

The foregoing detailed description has been given for clearness of understanding only, and no unnecessary limitations should be understood therefrom, as modifications would be obvious to those skilled in the art.

We claim:

1. A cord retainer for retaining an electrical cord of an portable electrical appliance comprising:

a slot defining a first plane;

a looped handle of the appliance defining a major plane wherein the major plane is generally parallel with the first plane; and a hook defining a second plane wherein the first plane is generally parallel to the second plane;

wherein the slot is located in the handle and the hook is attached to the handle.

2. The cord retainer of claim 1 wherein the first plane is coplanar with the second plane.

3. A cord retainer for retaining an electrical cord of an portable electrical appliance comprising:

a handle of the appliance having a major plane;

a slot located in the handle wherein the slot defines a slot plane; and a hook connected to the handle and spaced from the slot, wherein the major plane is generally parallel with the slot plane.

4. The cord retainer of claim 3 wherein the slot plane is coplanar with the major plane.

5. The cord retainer of claim 3 wherein;

the hook defines a hook plane; and the hook plane is generally parallel to the slot plane.

6. The cord retainer of claim 3 wherein:

the handle forms a loop; and the hook is attached to the loop.

* * * * *